United States Patent [19]

Tsutsumi

[11] Patent Number: 4,899,288
[45] Date of Patent: Feb. 6, 1990

[54] TEMPERATURE CONTROL INDICATING APPARATUS OF A HOT RUNNER IN A THERMOPLASTIC SYNTHETIC RESIN INJECTION MOLDING SYSTEM

[76] Inventor: Shigeru Tsutsumi, 1165 Touyama-Machi, Yonezawa-shi-Yamagata-ken, Japan

[21] Appl. No.: 193,403

[22] Filed: May 12, 1988

Related U.S. Application Data

[63] Continuation of Ser. No. 5,247, Mar. 27, 1987, abandoned, which is a continuation-in-part of Ser. No. 914,132, Nov. 1, 1986, abandoned, which is a continuation of Ser. No. 803,418, Dec. 2, 1985, abandoned.

[30] Foreign Application Priority Data

Dec. 5, 1984 [JP] Japan .................. 59-255687

[51] Int. Cl.⁴ .................. B29F 1/00; G06F 15/00
[52] U.S. Cl. .................. 364/476; 425/144
[58] Field of Search .................. 364/473, 476, 477; 425/143, 144, 548, 549; 264/40.6, 328.15; 374/170

[56] References Cited

U.S. PATENT DOCUMENTS

Re. 31,903  6/1985  Faillace ........................ 165/12
3,698,844  10/1972  Grimm ........................ 425/144
3,860,801  1/1975  Hunkar ........................ 425/144
4,094,940  6/1978  Hold ........................ 264/40.6
4,206,552  6/1980  Pomerantz et al. ........................ 34/23
4,208,176  6/1980  Salerno ........................ 425/144
4,376,244  3/1983  Gellert ........................ 219/523
4,426,239  1/1984  Umpmeier ........................ 156/64
4,438,064  3/1984  Tsutsumi ........................ 264/328.15
4,514,160  4/1985  Davidsmeyer ........................ 425/143
4,674,053  6/1987  Bannai et al. ........................ 364/146
4,695,237  9/1987  Inaba ........................ 425/144
4,726,751  2/1988  Shibata et al. ........................ 425/144

Primary Examiner—Allen MacDonald
Attorney, Agent, or Firm—Louis E. Marn

[57] ABSTRACT

In a temperature control indicating apparatus of a hot runner in a thermoplastic synthetic resin injection molding system, the apparatus has a hot runner comprising a body heater, a tip heater and a temperature sensor. The hot runner is connected to a hot runner temperature control circuit having A/D converter. The apparatus has the function of arithmetic control, setting operation and display. Further, the apparatus comprises a digital control means including a microprocessor, thereby the body heater of the hot runner is digital-controlled in the process of thermoplastic synthetic resin injection molding operation.

4 Claims, 13 Drawing Sheets

Prior Art

TEMPERATURE CONTROL INDICATING APPARATUS OF A HOT RUNNER IN A THERMOPLASTIC SYNTHETIC RESIN INJECTION MOLDING SYSTEM

RELATED APPLICATIONS

This application is a continuation of U.S. application Ser. No. 005,247, filed Mar. 27, 1987, now abandoned, which is a continuation-in-part of U.S. application Ser. No. 914,132, filed Oct. 1, 1986, now abandoned, which is a continuation of U.S. application Ser. No. 803,418, filed Dec. 2, 1985 now abandoned.

BACKGROUND OF THE INVENTION (1) Field of the Invention:

The present invention relates to a temperature control indicating apparatus of a hot runner in a thermoplastic synthetic resin injection molding system.

(2) Description of the Prior Art:

Conventionally, a temperature control means of a hot runner as shown in FIG. 4 is known.

Referring to the drawing, numeral 1 designates a hot runner (or called a probe), numeral 2 designates a tip heater (SPEAR* tip heater) set on the pointed end of the hot runner, numeral 3 designates a body heater set in the said hot runner, numeral 4 designates an analog indicator of a tip current acting on the said tip heater 2. The analog indicator 4 is connected with power control circuit 5.

* The word "SPEAR" is the Applicant's trademark.

Numeral 6 designates an analog indicator of a body current acting on the body heater 3, and the analog indicator 6 is connected with a power control circuit 7. Numeral 8 and 9 designate current control circuits respectively connected with the power control circuits 5 and 7, numeral 10 designates a temperature control circuit of the side of the body heater 3, the temperature control circuit 10 has an analog temperature indicator 11, and connects with a temperature setting part 12 and a temperature sensor 13 set in the hot runner 1, thereby a circuit 14 based on temperature control is constituted. Numeral 15 designates a current setting part, thereby a circuit 16 based on current control is constituted to the said circuit 14. Numeral 17 designates a change-over switch of the both circuits 14 and 16.

Numeral 18 designates a preheat current setting part of the side of the tip heater 2 and numeral 19 designates a tip current setting part. These parts are respectively constituted so as to change with a switch 20. Numeral 21 designates a timer circuit which acts by inputting signals originated each time of injection molding operation, the timer circuit 21 is constituted so as to change the switch 20.

In the constitution as described above, for the body heater 3, the temperature of the hot runner 1 which is sensed with the temperature sensor 13 and the desired setting temperature which is set at the temperature setting part 12 are controlled by operation in the temperature control circuit 10. The temperature is displayed with the analog temperature indicator 11, and thermostatically maintained by allowing necessary current to flow through the next steps of the control circuit 9 and the power control circuit 7 to the body heater 3. Further, in this case, the switch 20 is changed to the temperature side, when the switch 20 is changed to the side of the current control circuit 16, but the body heater 3 is easily heated by the set value in the current setting part 15.

On the other hand, for the tip heater 2, the conducting quantity which is previously set for preheating is determined by the preheat current setting part 18, the tip heater 2 is constantly heated through the change-over switch 20 with the current control circuit 8 and the power control circuit 5. The current value which is set in the tip current setting part 19 for switching a gate is changed by allowing to act the changeover switch 20 with the timer circuit 21 which acts in connection with the injection molding operation, thereby the temperature of the tip heater can be raised to a necessary setting temperature. Further, when the time of the timer circuit 21 is passed, the changeover switch 20 changes again to the opposite side, and the temperature of the tip heater 2 goes down to the preheat temperature.

Using the hot runner 1, which acts as described above, the heat insulation of molten resin in a runner part of an injection molding equipment, and the gate switch which is based on cooling hardening, heating and melting of the resin of a gate area adjacent to a cavity, can be smoothly conducted.

However, in the above conventional embodiment, since the temperature is generally controlled by an analog quantity and all of the indicators 4, 6, and 11 use the analog indication, there are many problems as follows.

(a) The controller including the body heater 3, the current control circuit 8 and 9 which control the tip heater 2, the power control circuits 5 and 7, the temperature control circuit 10 and the timer circuit 21 has many control parts for the analog control. Further, display and reading of the indicaters 4, 6 and 11 are inferior in accuracy.

(b) In the past, since one unit of an operation panel has been mounted on each hot runner 1, the more the number of the hot runner 1 has increased, the more the area occupied by the operation panel has increased. As the result, the whole controller construction inevitably has become a large size.

(c) In the past, an error has been easily made between the value which has been set by the length or the kind of the hot runner 1 and the actual current value. It has been caused by the complex control circuit based on the analog control. Further, the circuit has been expensive. It has been also difficult to obtain the desired accuracy owing to the change of temperature or voltage.

(d) The analog control has a problem in accuracy because there are individual differences in human operation such as adjustment or control.

(e) When remote control and group control are conducted, information of the temperature and current of each heater and system control and the like must be transferred. However, in the conventional analog system, it has been difficult to transfer the information.

(f) In the analog control, each control button of the temperature of the hot runner 1, the body current, the tip preheat and the tip current exists for each hot runner 1. As a result, the more the number of the hot runner is increased, the more the set button is proportionally increased.

BRIEF SUMMARY OF THE INVENTION

The present invention provides a new temperature control indicating apparatus of a hot runner in a thermoplastic resin injection molding system, wherein the conventional controller constitution is modified from analog control to digital control, thereby the whole can be made compactly by centralized control with a microprocessor. As a result, the apparatus may be easily operated, and enables current display and setting by root-mean-square value, betterment of reproducibility and a remote control.

Namely, the present invention concerns a temperature control indicating apparatus of a hot runner in a thermoplastic resin injection molding system, wherein the apparatus includes body heaters and tip heaters, hot runner temperature control circuit having A/D converters connected to hot runners which provide temperature sensors. Further, the apparatus has the function of arithmetic control, setting operation and display. Further, the apparatus includes digital control mechanism including a microprocessor, thereby heaters of the said hot runners are digital-controlled in the process of thermoplastic synthetic resin injection molding operation.

Still further, the present invention concerns a temperature control indicating apparatus of hot runner in a thermoplastic resin injection molding system, wherein the apparatus comprises body heaters and tip heaters which are attached to plural thermoplastic synthetic resin injection molding machines, and the apparatus controls hot runners which have temperature sensors, characterized in that the apparatus can be controlled and monitored by one control panel.

BRIEF DESCRIPTION OF THE ACCOMPANYING DRAWINGS

DESCRIPTION OF PREFERRED EMBODIMENTS

Figure 1:
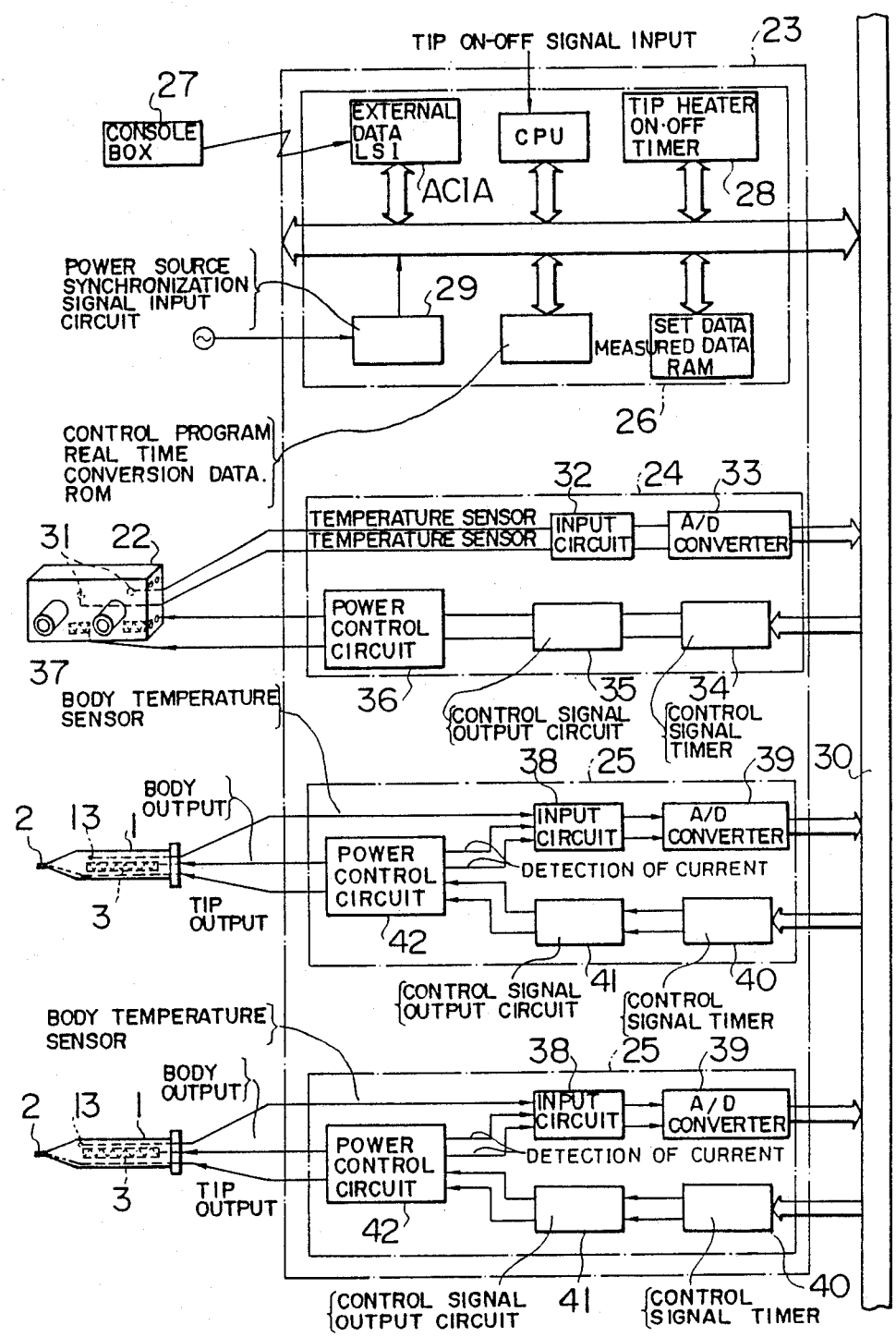
FIG. 1 is a circuit schematic diagram of the whole construction of an apparatus according to this invention.
Figure 2:
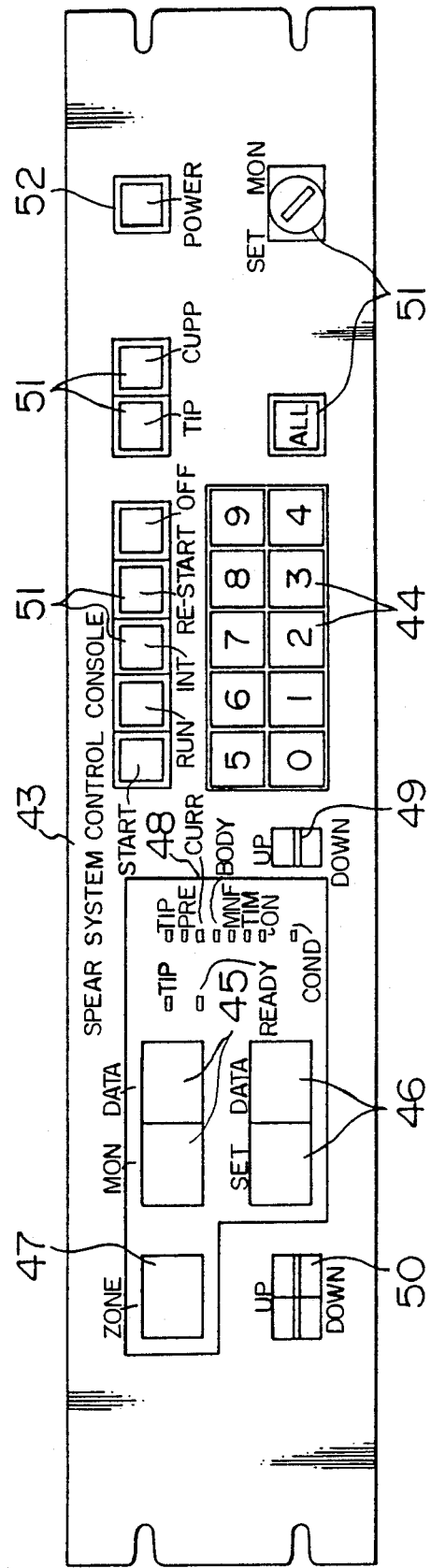
FIG. 2 is an elevational constitution view of the aforesaid apparatus.

An embodiment of the present invention will be described in the following.

Since the same or corresponding parts have the same numerals as the prior art, the details of explanation are omitted.

Numeral 22 is a manifold which supports the desired hot runners 1 in a metallic mold. Numeral 23 is digital control provided with a microprocessor (CPU) which can control the temperature of the manifold 22 and each hot runner 1. Further, the digital control 23 includes a manifold temperature control circuit 24, each hot runner temperature control circuit 25 and a CPU unit 26, the CPU unit 26 includes, in addition to a microprocessor CPU which conducts various operation and data transfer, ROM which stores a system program necessary to various operation and data transfer, RAM which stores temporary data such as each setting value, detect value or transfer data and acts as a work space of CPU, AC1A which automatically carries out the data communication between a console box 27 and AC1A, a timer 28 which controls in time the heat of a tip heater and gives the timing of PID operation, a circuit which detects a synchronizing signal necessary to phase control, and the like. Numeral 30 is a bus driver which connects the CPU unit 26 to control circuits 24 and 25.

The said PID operation is described hereunder. The control in current and temperature of the hot runner 1 uses the PID control representative as the closed loop known as analog temperature control. The equation of the idealized analog PID control is as follows:

$$M = \left( e + \frac{1}{TI} \int edt + TD \frac{de}{dt} \right) \quad (1)$$

M: Manipulated variable
K: proportional gain
e: deviation = set temperature − measured temperature
TI: integral time
TD: differential time The sampling period to measure the hot runner 1 temperature as TS makes the equation (1) to guide to following equation:

$$Mn = K \left( en + \Sigma \frac{TS}{TI} en + \frac{TD}{TS} (en - en - 1) \right) \quad (2)$$

By separating factors in (1) and (2) equations, the basic equation (3) for digital PID control can be obtained as follows:

$$Mn = K\,pen + \Sigma\,kfen + KD\,(en - en - 1) \quad (3)$$

| | |
|---|---|
| $KP = K$ | propotional gain |
| $KI = K \times \frac{TS}{TI}$ | instegral gain |
| $KD = K \times \frac{TD}{TS}$ | differential gain |
| $Mn$ | manipulated variable at $n$ sampling time |
| $en$ | deviation at $n$ sampling time |

The respective manipulated variable and operation of each term of the basic equation (3), namely proportional term (Kpen), Integral term (Σ KIen), Differential term (KD (en−en−1)) can be decided and controlled properly. The manipulated variable and operation of each term are described hereunder.

(A) manipulated variable of proportional term (Kpen) manipulated variable of proportional term as Mp makes $$Mp = Kp \times en + M\phi$$

and hence Mφ is generally considered bias volume and set 50% of the maximum output. The object of this term is to make the difference (en) between set and measured temperatures as big as factor times (Kp), to vary bias volume (M$\phi$) as such and to make it feed back to the output.

Thus, when the difference arises between set and measured temperatures, the difference makes the output current vary proportionally thereto and compensates temperature immediately.

(B) manipulated variable of Integral term ($\Sigma$ KIen) manipulated variable of Integral term as M1 makes from equation (3)

$$MIn = (integral\ gain\ KI \times deviation\ en) + MIn - 1$$

and hence controls output current in the integral volume so far as the deviation between set and measured temperature remains at least and makes precise temperature control.

(C) manipulated variable of Differential term (KD (en−en−1)) manipulated variable of different term as MD makes from equation (3).

$$MDn = Differential\ gain\ KD \times (Deviation\ en - Deviation\ en - 1)$$

which is considered to be critical value for the controller works steady. In fact, noise and resin temperature of the hot runner 1 itself affect the control to be unsteady and to arise hunting, which leads to $$MDn = Differential\ gain\ KD \times (measured\ value\ tn - 1 - measured\ value\ tn) + \frac{1}{2} MDn - 1$$

and decides the manipulated variable by incomplete differential.

This term works to control the hot runner 1 current under future predictive action in accordance with the variation of temperature deviation.

Hereupon, in the manifold temperature control circuit 24, very small analog signals which are detected at plural temperature sensors 31 provided in the manifold 22 are supplied into an input circuit 32. The analog siganls are suitably amplified at the circuit 32 which is connected with an AIP converter to convert the signals into digital quantities. The converted signals are treated through a bus driver 30 with the microprocessor CPU. The control signals from the microprocessor CPU pass through the bus driver 30, allow to act a timer for generating control signals 34, pass through the next step of a control signal output circuit 35, switch by ON-OFF a heater 37 to maintain with accuracy the temperature reset with a power control circuit 36 at the manifold 22.

Then, the hot runner temperature control circuits 25, like the manifold temperature control circuit 24, is constituted with an input circuit 38, an A/D converter 39, a timer for generating control signals 40, a control signal output circuit 41 and a power control circuit 42. The detection signals of the temperature sensor 13 and the detection signals corresponding to the currents which flow at the tip heater 2 and the body heater 3 respectively, are treated through an input circuit 38 with an A/D converter 39 so as to convert into the desired digital quantities, and the signals are connected with the microprocessor CPU.

In the detailed explanation of the temperature control treatment of the microprocessor CPU, first of all, it is able to control the A/D converts 33 and 39. Namely, although each of very small signals of the plural temperature sensors 13 which are set in the manifold 22 is suitably amplified at the input circuit 32. In this case, the input circuit of the A/D converter, is selectively switched, the completion of the A/D conversion is confirmed and the conversion data are read. The detection signals of the current which flows in the temperature sensor 13, and the heaters 2 and 3 of the runner part 1, also act as described above.

And then, the temperature control of the manifold 22 and the hot runner 1 and the temperature control which is the closed loop control of the current flowing in the heater 2 and 3 are exactly conducted by the typical PID control.

Further, in the temperature sensors 31 and 13 for linearization of the measured temperature, thermocouples are used. Those thermocouples generally have no complete linearity between the temperature and the output. Then, for this linearity, the microprocessor CPU is adapted to read out the contents of the memory region, in which the normalized temperature data corresponding to the conversion data of the A/D converters 33 and 39 are previously programmed by assigning the contents to the conversion data of the A/D converters 33 and 39. Thus, the said A/D converter 33 enables the microprocessor CPU to control the temperature of the manifold 22 and another A/D converter 39 enables the microprocessor 23 to convert the electro motive force of the temperature sensor 13 of the hot runner 1 and to convert properly the maximum value current running the body heater 3 and the hot runner 1. Further, with the microprocessor 23, the control timing has the following operations in order:

(1) change over A/D converter input
(2) confirm A/D converter finish
(3) read in converter data The display construction of the console box 27 will hereinafter be explained. Numeral 43 is a panel plate, numeral 44 is a button for setting a numerical value, numeral 45 is a digital display part for monitoring, numeral 46 is a digital display part for setting, and numeral 47 is a digital display part for a zone which displays the necessary hot runner 1. Numeral 48 is a display part of each part such as the tip heater 2 or the body heater 3 of the hot runner 1, and the current which flows in these heaters or the operating time of the timers 34 and 40. Numeral 49 is a selection button of the display part 48 and has UP and DOWN. Numeral 50 is a selection button of the digital display part for a zone 47. It has UP button and DOWN button. Numeral 51 is plural buttons for operating the other parts and numeral 52 is a power supply button.

The panel plate 43 having such a construction is included in the console box 27. The console box 27 further includes several components, namely, the microprocessor CPU, the manifold temperature control circuit 24, and the hot runner temperature control circuit 25. Thus, the panel plate is formed compactly in a small size by including several electric parts.

In the above construction, an operation of this embodiment will hereinafter be explained.

The various buttons 44, 50 and 52 provided on the panel display plate 43 are allowed to be operated selectively.

In this case, the set value, the measured value and the like are displayed by digital at the display parts 45 and 46, so that it is able to be operated without wrong operation while watching the display.

The measured electromotive force of the manifold 22 and the temperature sensor 31 and 13 of the necessary number of hot runners is converted from analog quantity to digital quantity with the A/D converters 33 and 39 to be transferred to the CPU. Thus, an output signal of the digital quantity is obtained by accurately calculating with the CPU unit 26, and the signal passes through the timers for generating the control signal 34 and 40 of the temperature control circuits 24 and 25 and the next step of the control signal output circuits 35 and 41, and the power control circuits 36 and 42 to make heaters 37, 2 and 3 work under the set temperature.

Further, in the hot runner temperature control circuit 25, the current quantity which flows in the tip heater 2 and the body heater 3 is detected and supplied through the input circuit 38 into the A/D converter 39 to convert to a digital signal, thereby the signal can be watched at any time with the digital display parts 45 and 46 of the panel plate 43.

Accordingly, in the injection molding operation of the thermoplastic synthetic resin, the temperature control of the hot runner 1 and the display can be accurately conducted.

Figure 3:
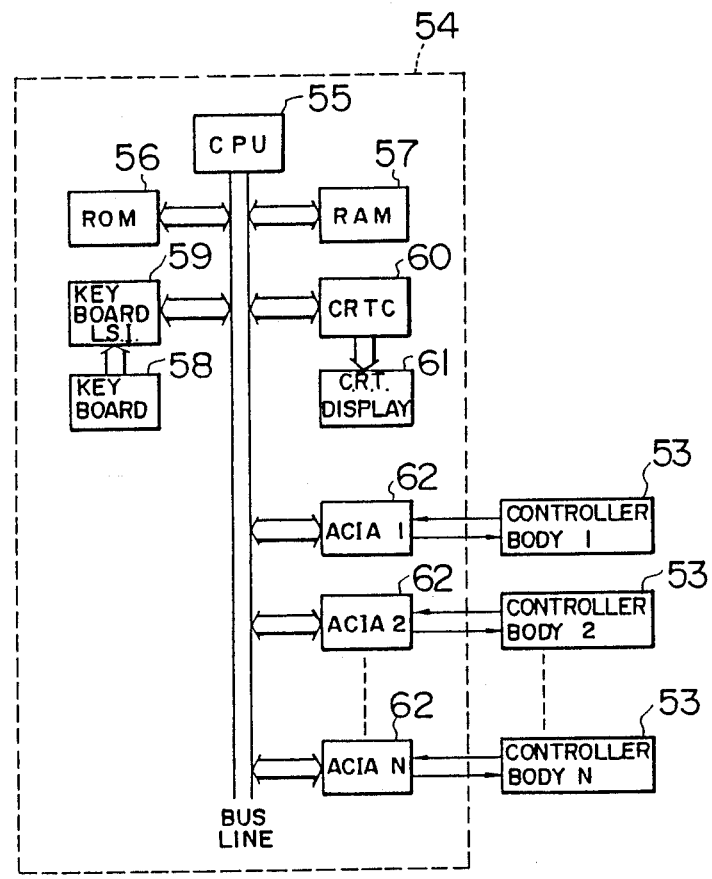
FIG. 3 is a circuit schematic diagram of an alternate embodiment of the invention.
Figure 4:
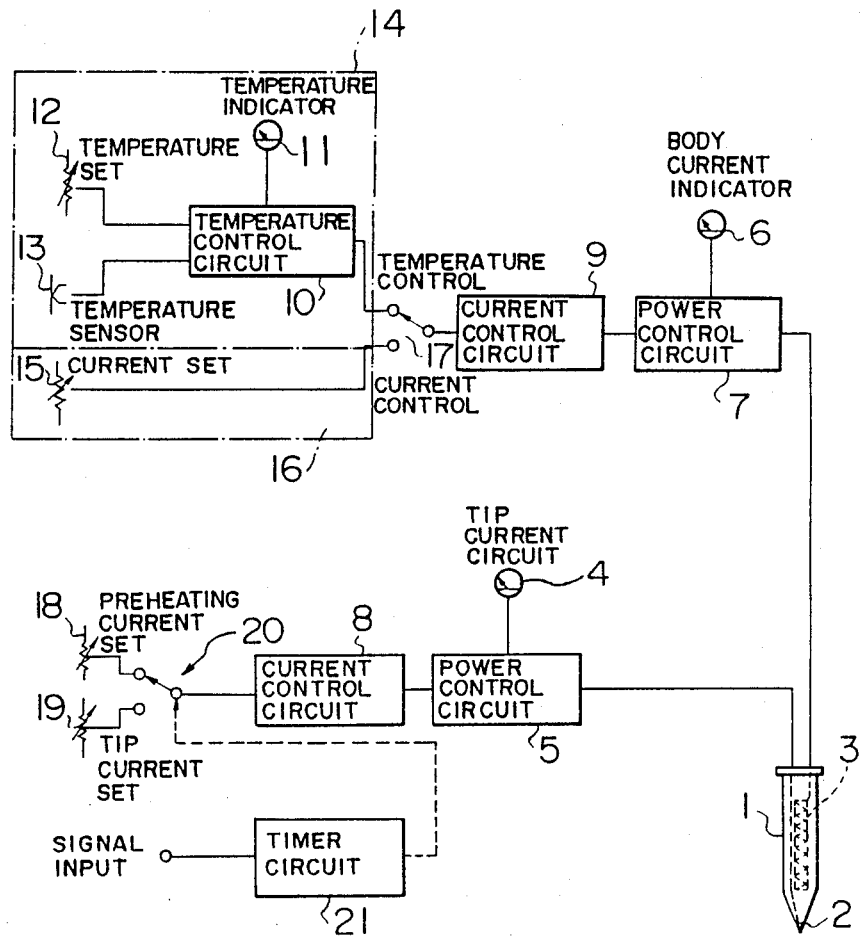
FIG. 4 is a circuit schematic diagram of a conventional embodiment.
Figure 5:
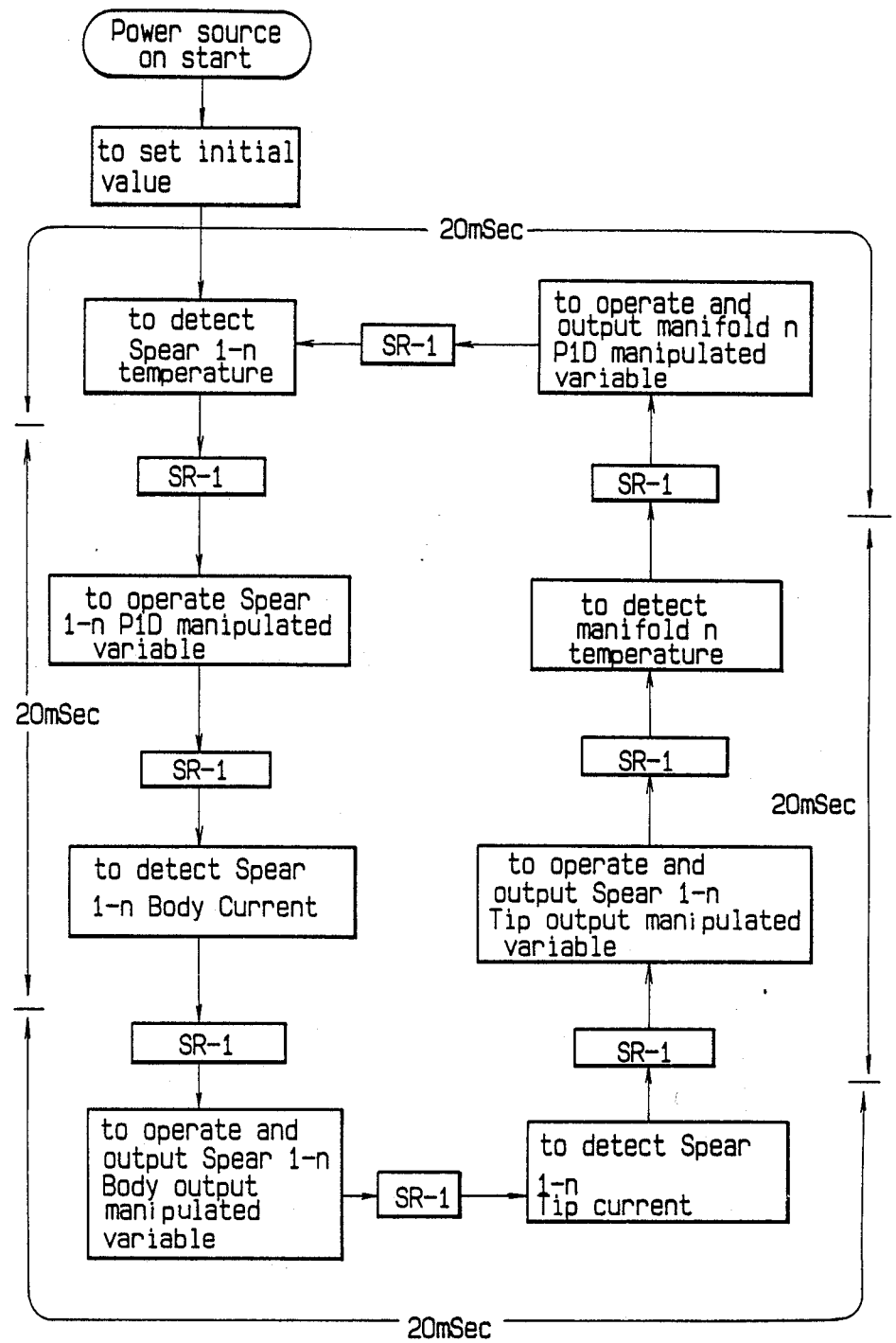
FIG. 5 is a data transfer sub-routine.
Figure 6A:
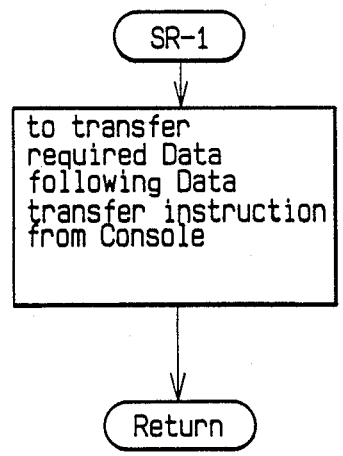
FIG. 6a is in a basic relation between sub-routine and interruption and in FIGS. 6b-6d three different terms of interruption.
Figure 6B:
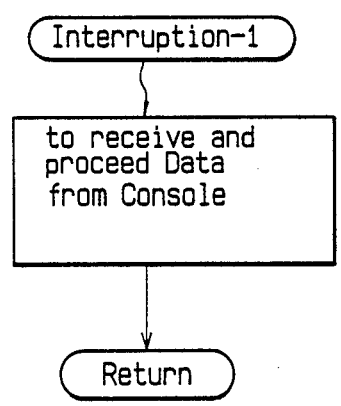
Figure 6C:
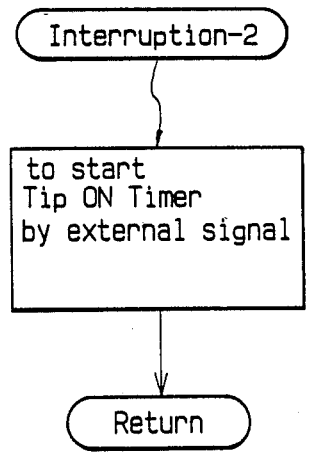
Figure 6D:
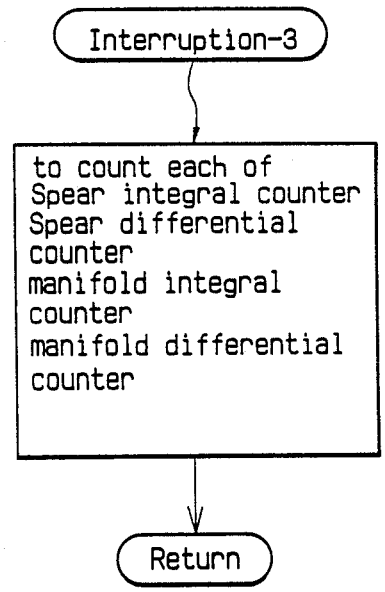
Figure 7:
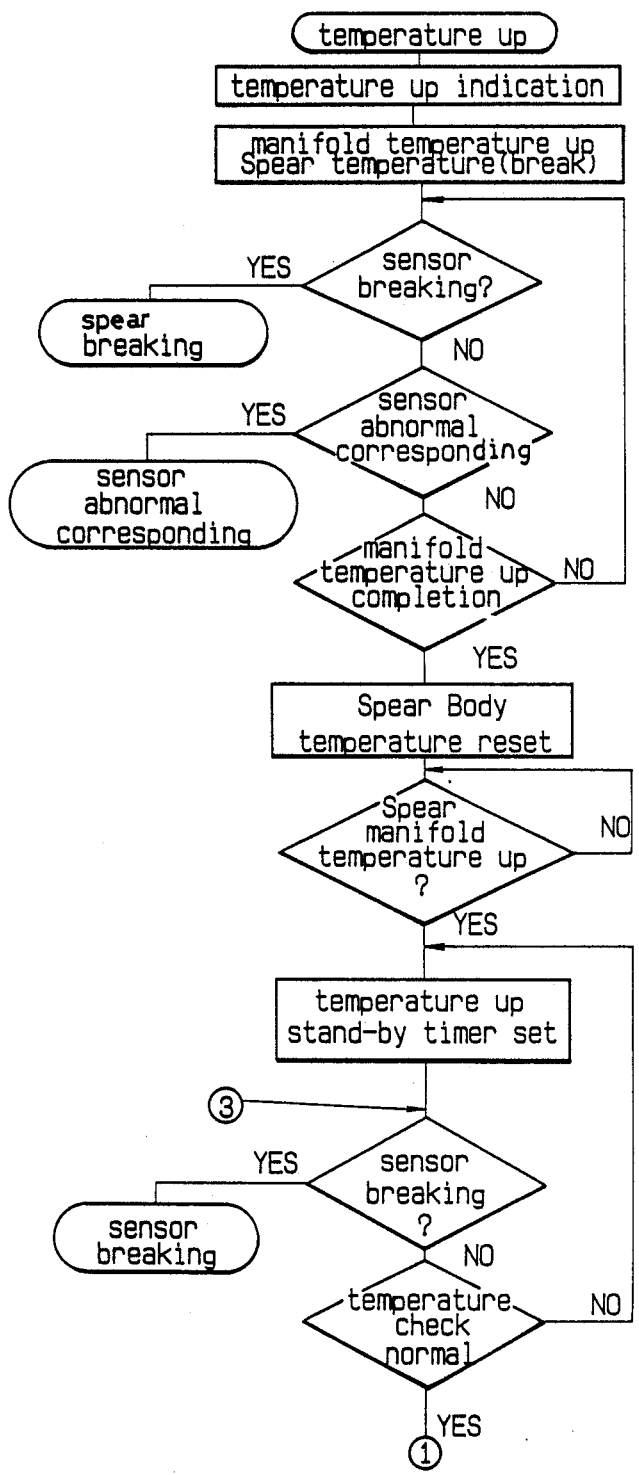
FIG. 7 and 8 are temperature up operation flow charts.
Figure 8:
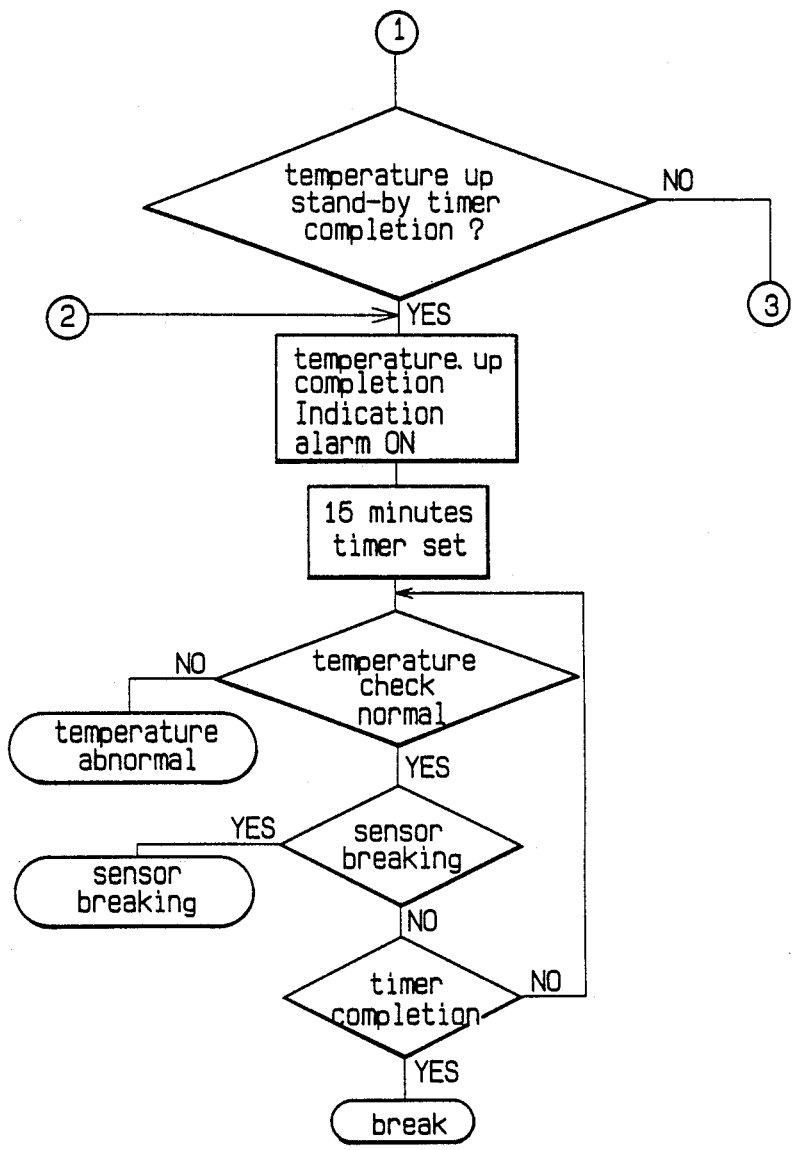
Figure 9:
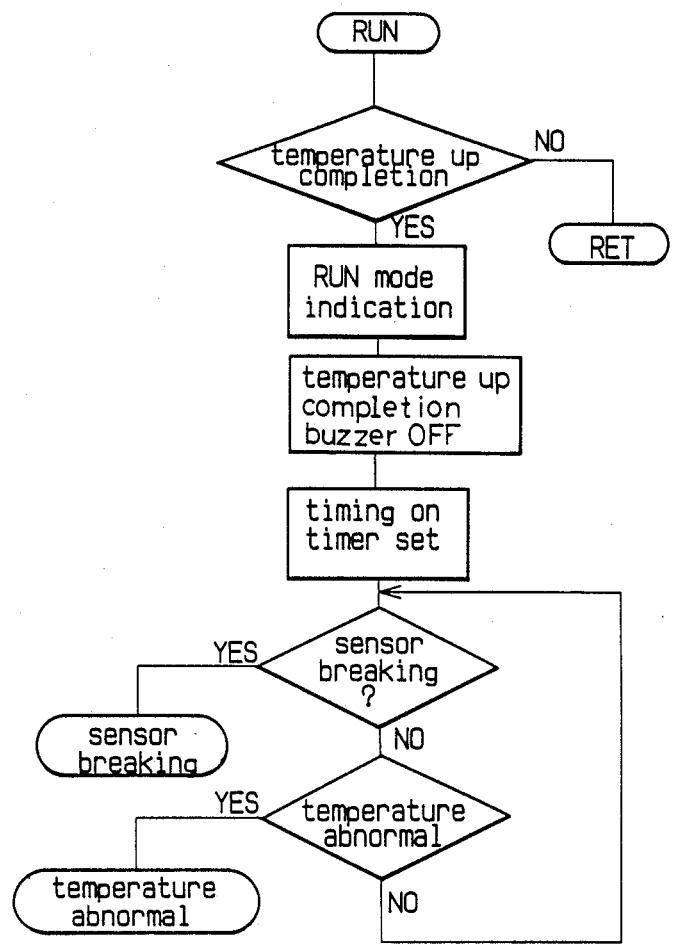
FIG. 9 is a molding operation flow chart.
Figure 10:
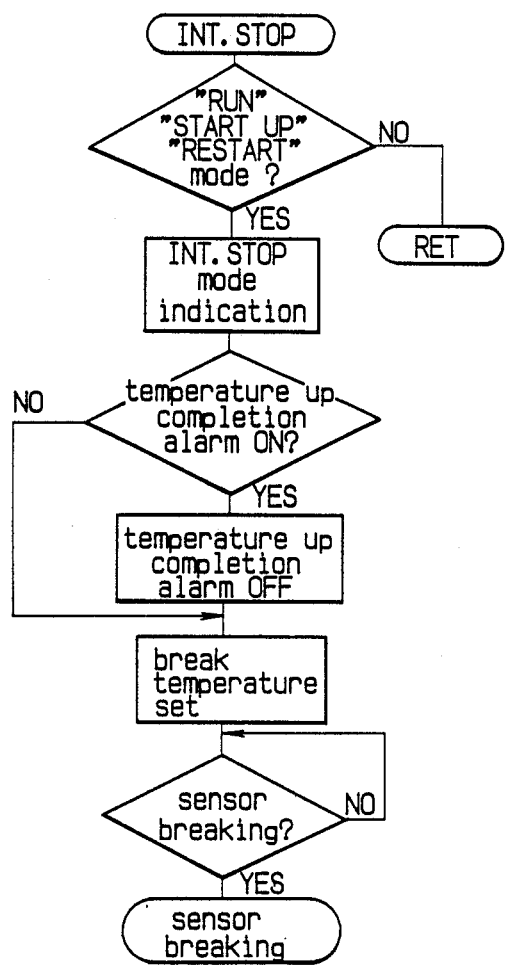
FIG. 10 is a break operation flow chart.
Figure 11:
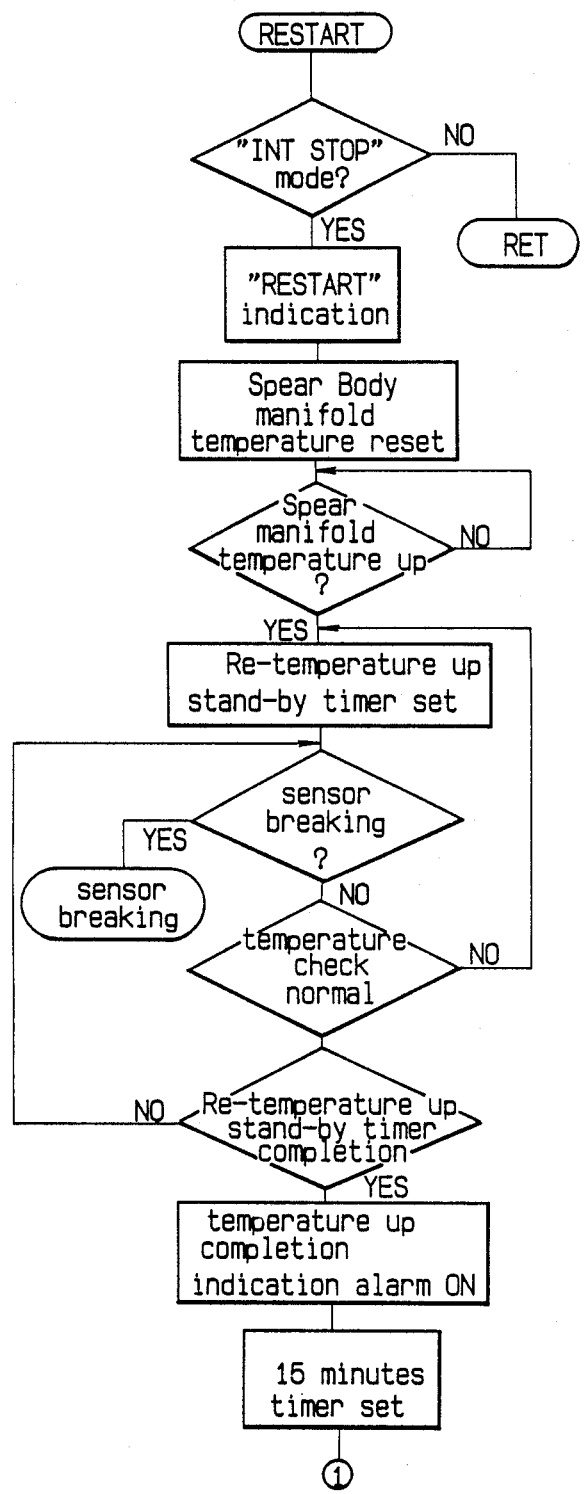
FIGS. 11 and 13 are re-temperature up operation flow charts.
Figure 12:
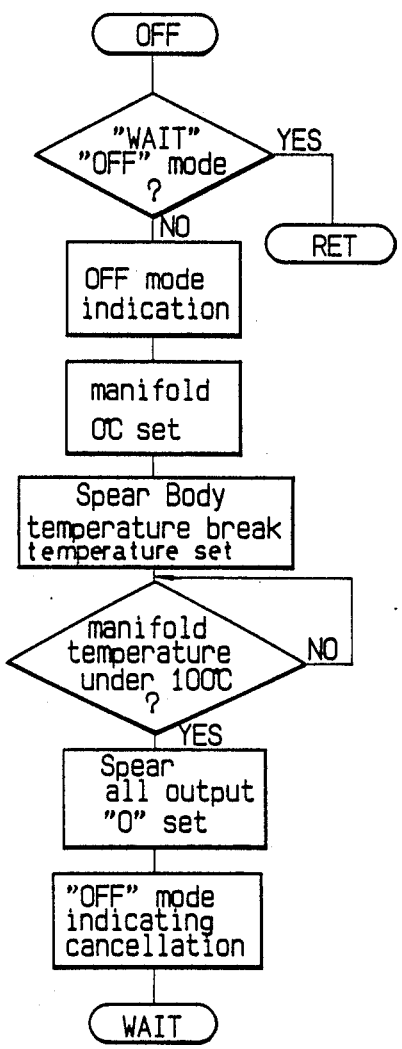
FIG. 12 is a stop mode operation flow chart.
Figure 13:
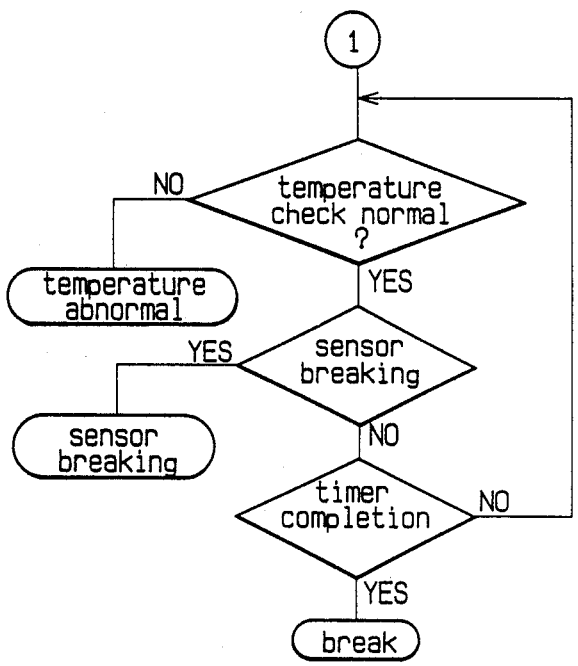

The other example of the present invention will herein after be explained with reference to FIG. 3. FIG. 3 is a construction view in the occasion that a plurality of temperature control display apparatuses 53 (SPEAR controller body) of the hot runners 1 mounted to the thermoplastic synthetic resin injection molding machines are controlled by a control console box.

Since the temperature control display apparatus 53 of the hot runners 1 are the same apparatus as shown in FIG. 1, the detailed description is omitted.

The console box 54 includes a microprocessor (CPU) 55, conducts the given operating with ROM 56 in which a program for system control is stored. ROM 57 is used for temporal storage of the data or set values and the like from the body and the work space of CPU, etc. Further, RAM conducts protection from the power supply cut, what is called battery back up, with a secondary cell in the case of temporal power supply cut or power stoppage, etc. The indication to the console box is conducted with a keyboard, and sent to the CPU 55 with LSI for the keyboard 59. In that place, the kind of the pushed key is judged and the later treatment is judged to be put into practice. The display of human instructions to the console box, namely the display about which has been pushed, or the conditions of each controller body 53, namely each data of the hot runner 1 and the manifold are displayed on the CRT display, by the instruction and judgement of the CPU 55, with LSI for the exclusive use of CRT display named CRTC 60. For the communication between bodies, a line of several AC1A 62 which are LSI for the exclusive use of communication are used.

These parts in a body can display and watch the several SPEAR controller bodies or temperature control display apparatus 53 in accordance with the program which is stored in ROM 56. For the display depends on the CRT display 61, it is able to display many data in comparison with LED etc., thereby it is possible to display clearly.

Thus, though the controller bodies are the same, when the console box is exchanged, centralized remote supervisory and centralized control of the several controller bodies, namely the so-called group control becomes possible. In spite of the existence of maximum based on the number of AC1A, the controller bodies 53 can be grown in number without limit within the limits of numbers of AC1A.

The basic program (flow chart) to describe the said temperature control of this application is shown in FIGS. 5-13. These flow charts show the hot runner 1 as Spear and consist of the following three routines:
1. Normal control routine
   Hot runner body temperature control
   Hot runner body current control
   Hot runner tip current control
   Manifold temperature control
   Data transfer processing
2. Interruption handling routine
   Receive data handling
   Tip-ON signal handling
   PID constant handling
3. Initial set routine According to the present invention, unlike conventional analog control, as the temperature of the hot runner is controlled by digital control, its reappearance property can be improved. Further, the whole can be made in a small size and improved in the operation. Thereby, many hot runners can be set in comparison with conventional apparatus. As the current running each heater can be detected and controlled by root-mean-square value, and as the current is in proportion to actual calorific value, it has an effect in improvement of accuracy in comparison with conventional average detection control.

As a result, any inconvenience of measurement based on digital indication and setting errors is avoided.

Moreover, as the control part and the display setting part are separated, the remote control is very easy. By making the display and setting parts on a large scale, centralized supervision and centralized control of several control parts, namely so-called group control becomes possible. As the display part can be replaced by leaving the controller body as it is, the present invention is applicable for many cases. From the result of the actual molding, even if there are changes of supply voltage and atmospheric temperature, the apparatus is accurately controlled in comparison with conventional controllers. Accordingly, the obtained moldings are scarcely affected by these changes. In continuous molding for 24 hours, when the conventional controller is used, the quality of moldings are stabilized by the change of the set values between day and night. However, when the controller obtained by the present invention is used, the change of the set values becomes unnecessary. Consequently, the productivity can be improved at the rate of 20%.

What is claimed is:

1. A temperature control indicating apparatus for a hot runner in a thermoplastic synthetic resin injection molding system, which comprises:
   a central processor including digital controller including a microprocessor;
   a bi-directional communication channel connected to said central processor;
   hot runners, each hot runner including a body heater remotely positioned from said central processor; and
   a hot runner temperature controller having A/D converter connected to each hot runner and said bi-directional communication channel for controlling current to said body heater of each hot runner.

2. The temperature control indicating apparatus as claimed in claim 1, wherein a hot runner is disposed in each of a plurality of thermoplastic synthetic resin injection molding machines, and further including temperature controller indicating means connected to each hot runner indicating status of each hot runner.

3. The temperature control indicating apparatus as claimed in claim 1 wherein said microprocessor of said digital controller receives a plurality of digital status signals from each hot runner indicative of status and wherein said microprocessor included in said digital controller, is selectively addressable by said central processor for forwarding backover said bi-directional communications channel, said plurality of status signals.

4. The temperature control indicating apparatus as claimed in claim 3 and further including read-only-memory means of a program for checking via said bi-directional communication channel actual status of each hot runner for transmitting a status signal back to said central processor upon receipt by said digital controller of said control signals from said central processor.

* * * * *